H. CARLE.
LABELING MACHINE.
APPLICATION FILED MAY 14, 1918.
1,405,755.
Patented Feb. 7, 1922.
10 SHEETS—SHEET 9.
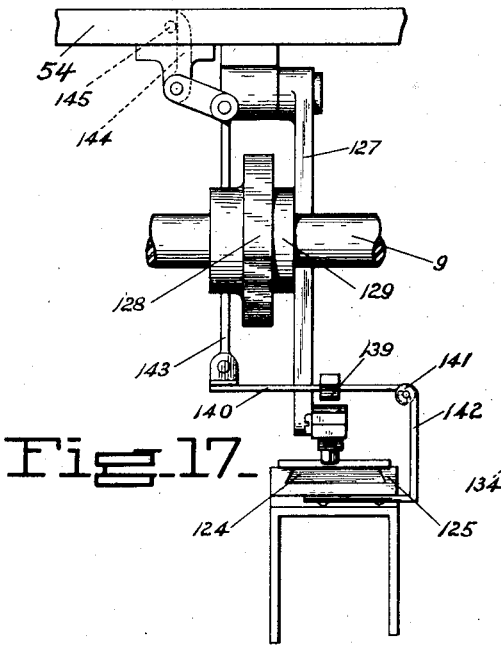
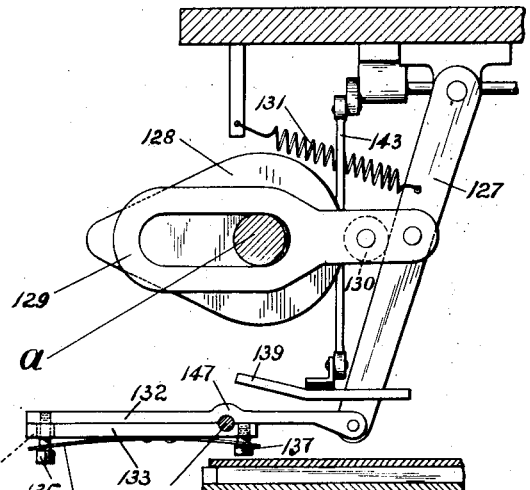
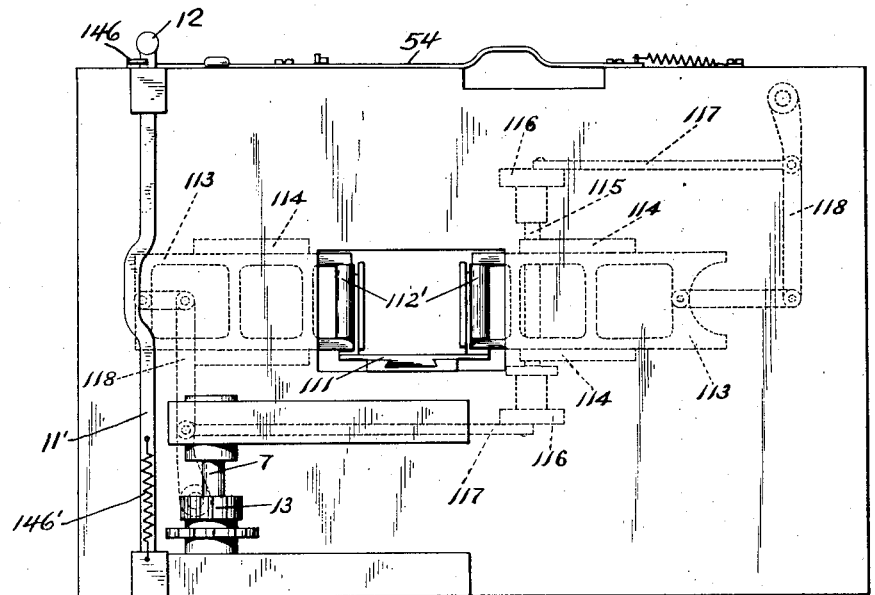
INVENTOR
H. Carle
BY
Duell, Warfield & Duell
ATTORNEY

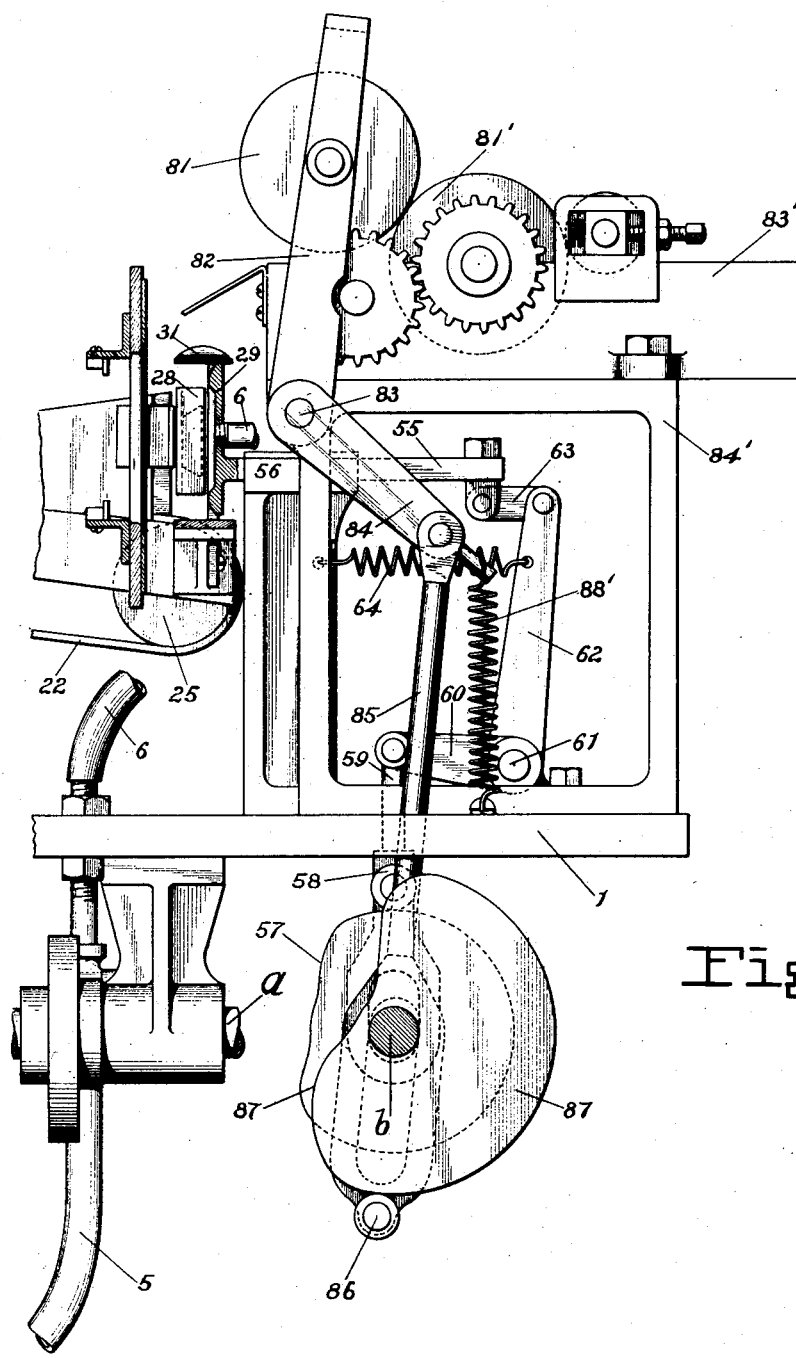

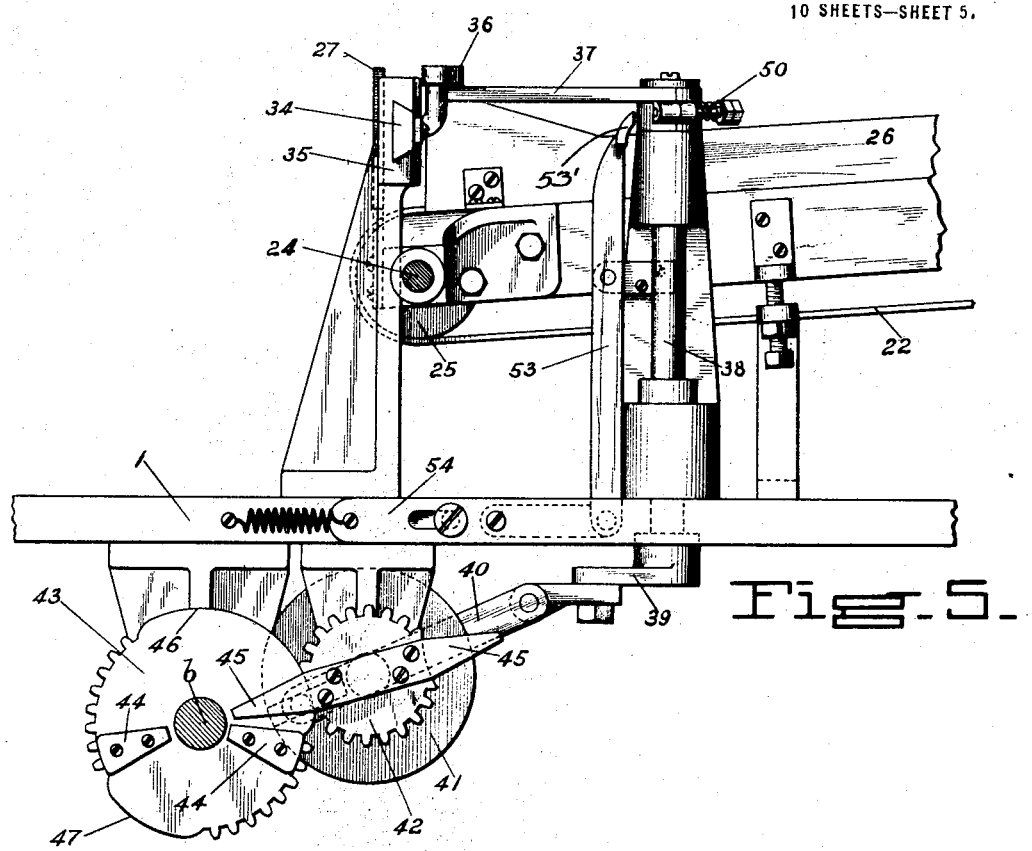
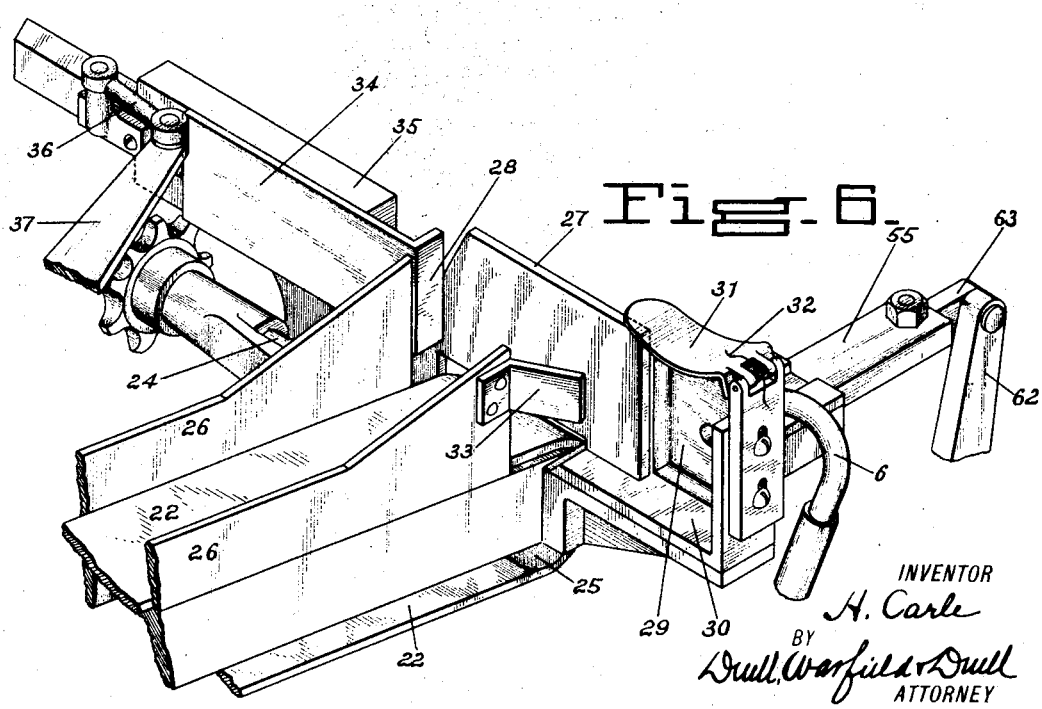

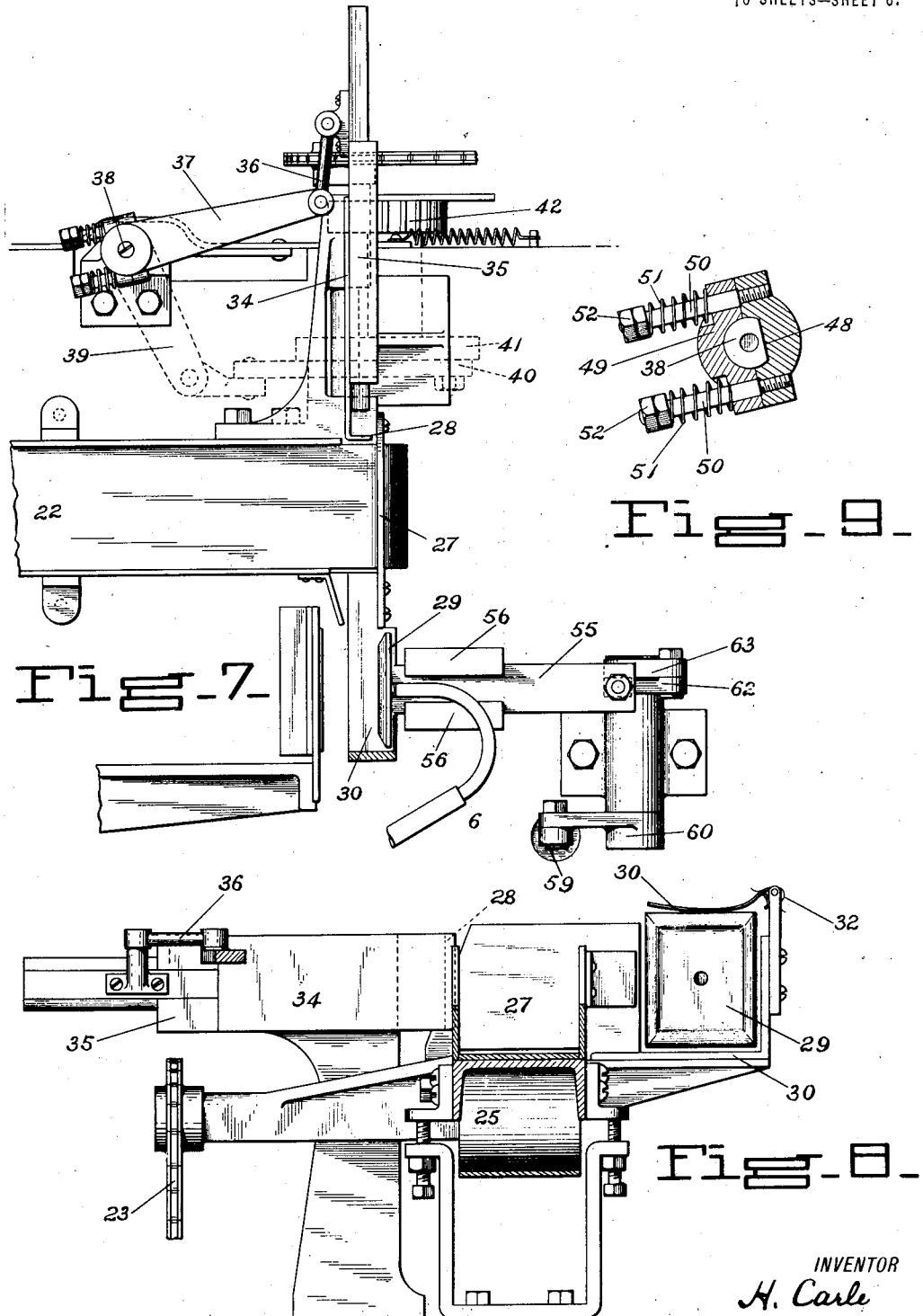

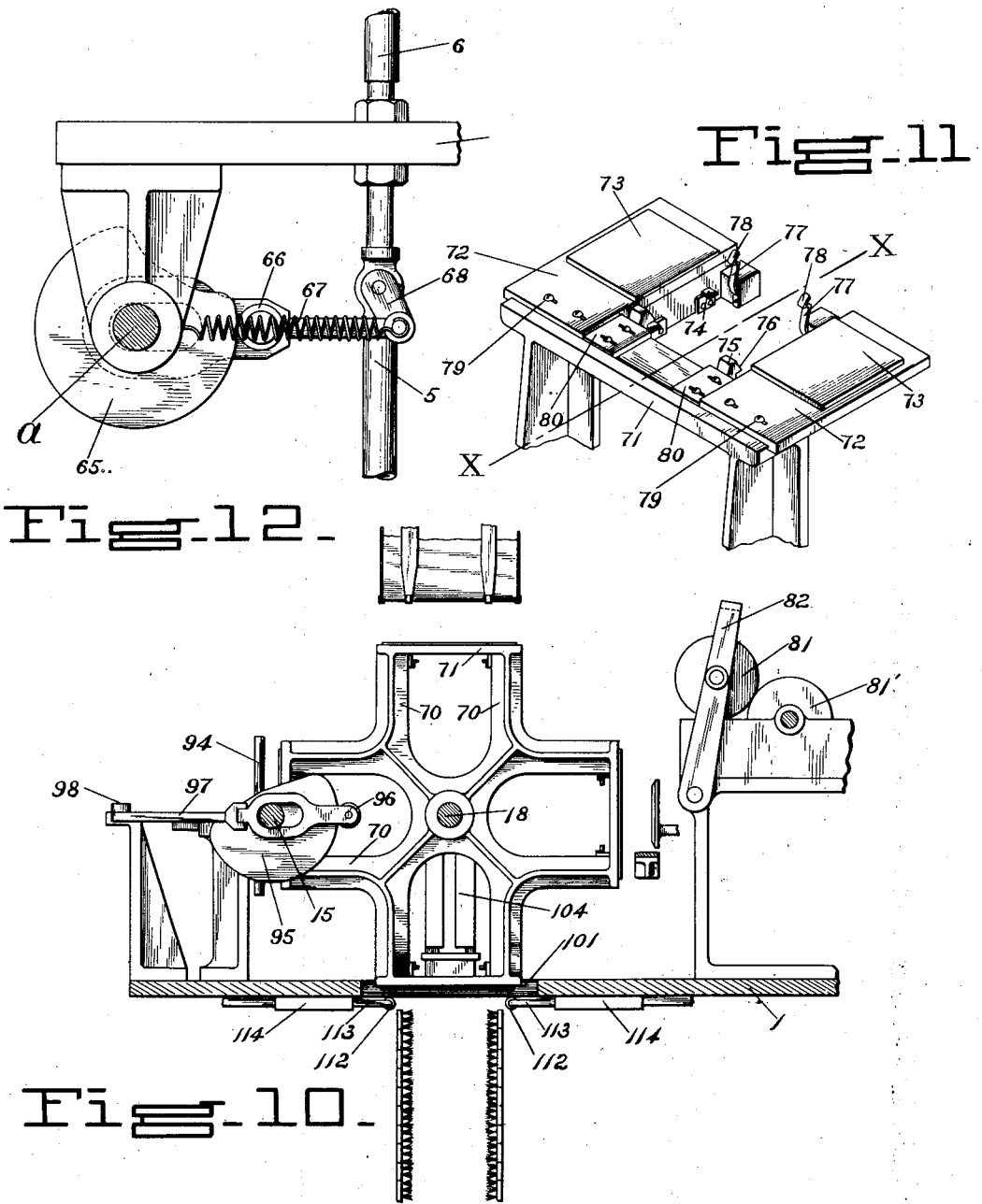

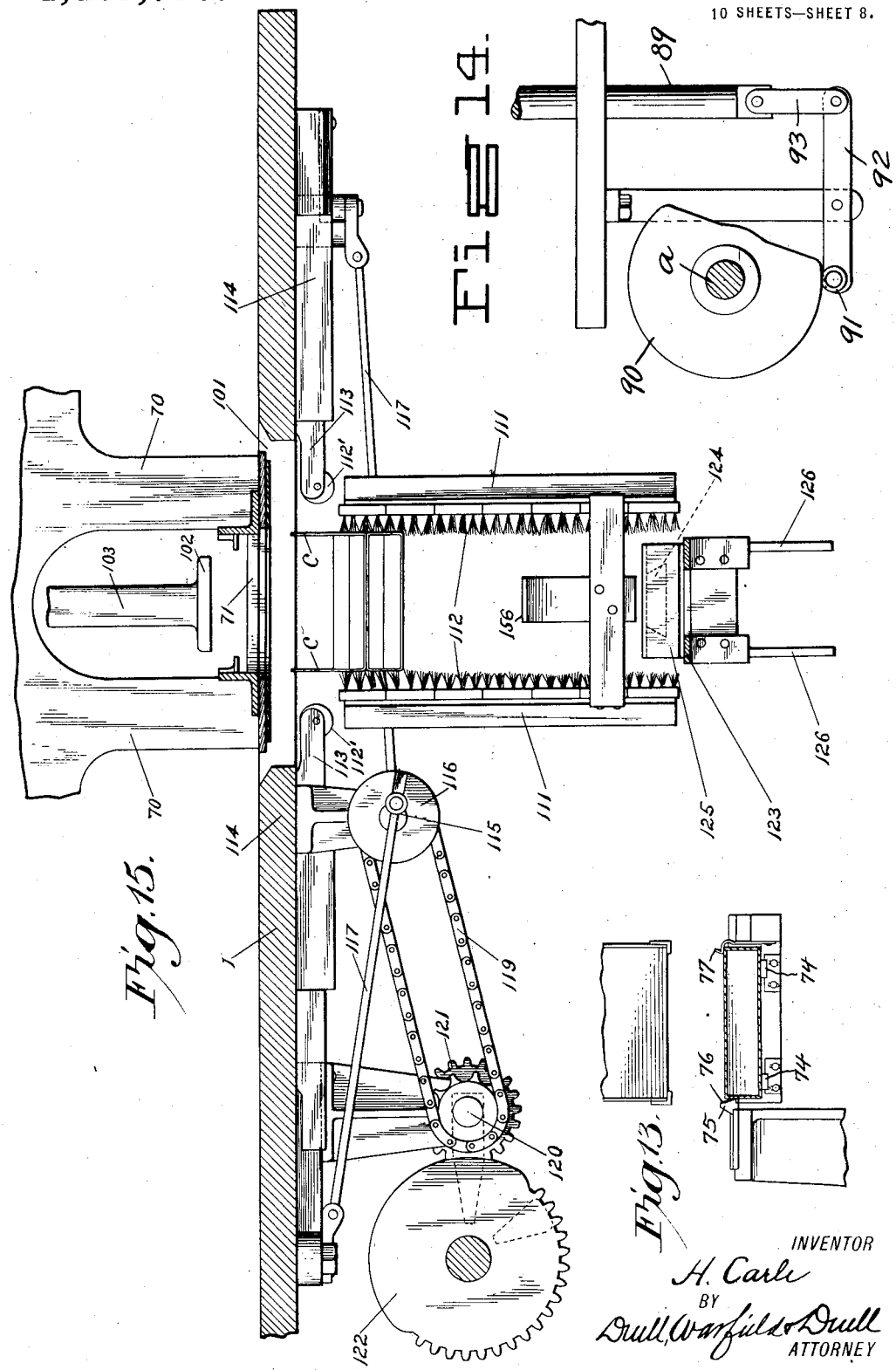

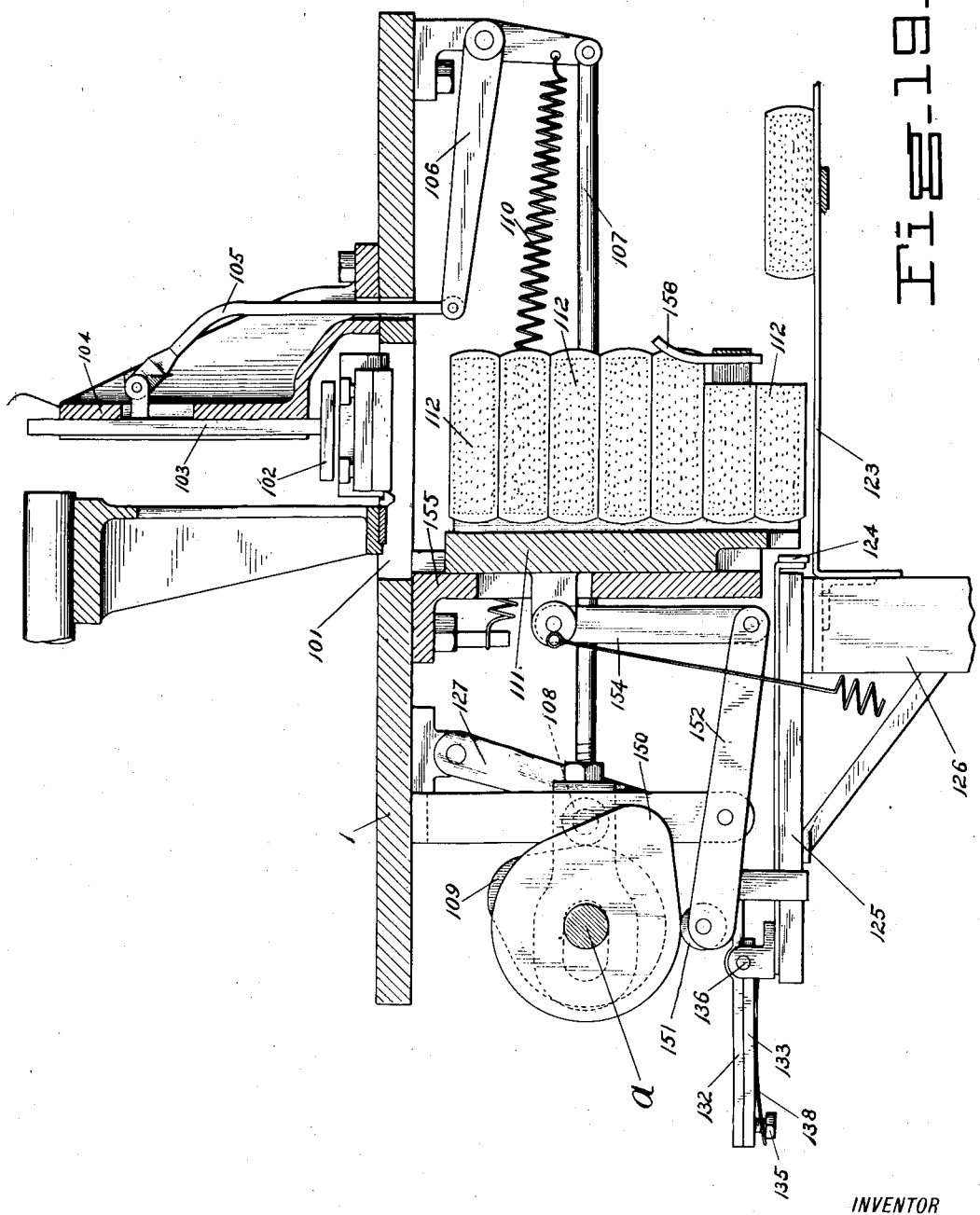

UNITED STATES PATENT OFFICE.

HAROLD CARLE, OF BUFFALO, NEW YORK, ASSIGNOR TO F. N. BURT COMPANY, LIMITED, OF TORONTO, ONTARIO, CANADA, A CORPORATION OF ONTARIO.

LABELING MACHINE.

1,405,755.  Specification of Letters Patent.  Patented Feb. 7, 1922.

Application filed May 14, 1918. Serial No. 234,368.

*To all whom it may concern:*

Be it known that I, HAROLD CARLE, a subject of the King of Great Britain, residing at Buffalo, in the county of Erie and State of New York, have invented certain new and useful Improvements in Labeling Machines, of which the following is a full, clear, and exact description, such as will enable others skilled in the art to which it appertains to make and use the same.

This invention relates to machines for applying labels or strips to articles such as paper boxes, and with respect to its more specific features, to devices of the character referred to for automatically applying a label or strip of paper, cloth, etc., to a box so as to label, or at the same time label and hinge, the sections of a two-part box.

One of the objects of the invention is the provision of a simple construction of machine adapted to automatically perform the various operations in effecting the labeling of a box.

Another object of the invention is the provision of a simple construction of labeling machine and one wherewith different kinds of labeling may be performed by simple adjustment of the parts of the machine.

Another object of the invention is to provide a labeling machine which is simple in construction and at the same time rapid and efficient in operation.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings forming part of this specification, wherein similar characters refer to similar parts throughout the several views,—

Fig. 4 is a detail, being vertically sectioned to more clearly disclose the construction of certain elements of the box feeding devices;

Figs. 5, 6, 7, 8 and 9 are detail views of the box feeding devices on a larger scale than shown in Fig. 1;

Fig. 10 is a rear detail view showing the turret or box carrier, and the general relation therebetween, at the gluing, labeling, pressing and discharging stations;

Fig. 11 is a perspective view of the glue pad and the parts associated therewith;

Fig. 12 is a detail view illustrating the operative means for controlling the pneumatic gripper forming a portion of the box feed devices.

Fig. 13 is a vertical section on the line X—X of Fig. 11, also showing the label magazine in position thereabove;

Fig. 14 is a view of the cam operating mechanism for the label applying device;

Fig. 15 is a vertical section through the main table showing certain label folding devices and their operative mechanism;

Fig. 16 is a plan of a portion of the machine showing, in dotted lines, the label folding devices illustrated in Fig. 15;

Fig. 17 is an end view of a certain box feeding device or pusher which comes into operation after the labeling has been effected;

Fig. 18 is a vertical section through Fig. 17; and

Fig. 19 is a vertical section illustrating the relation between the box carrier and a channel into which the boxes are discharged, details of the discharging mechanism and the channel operating mechanism being also illustrated.

Figure 1:
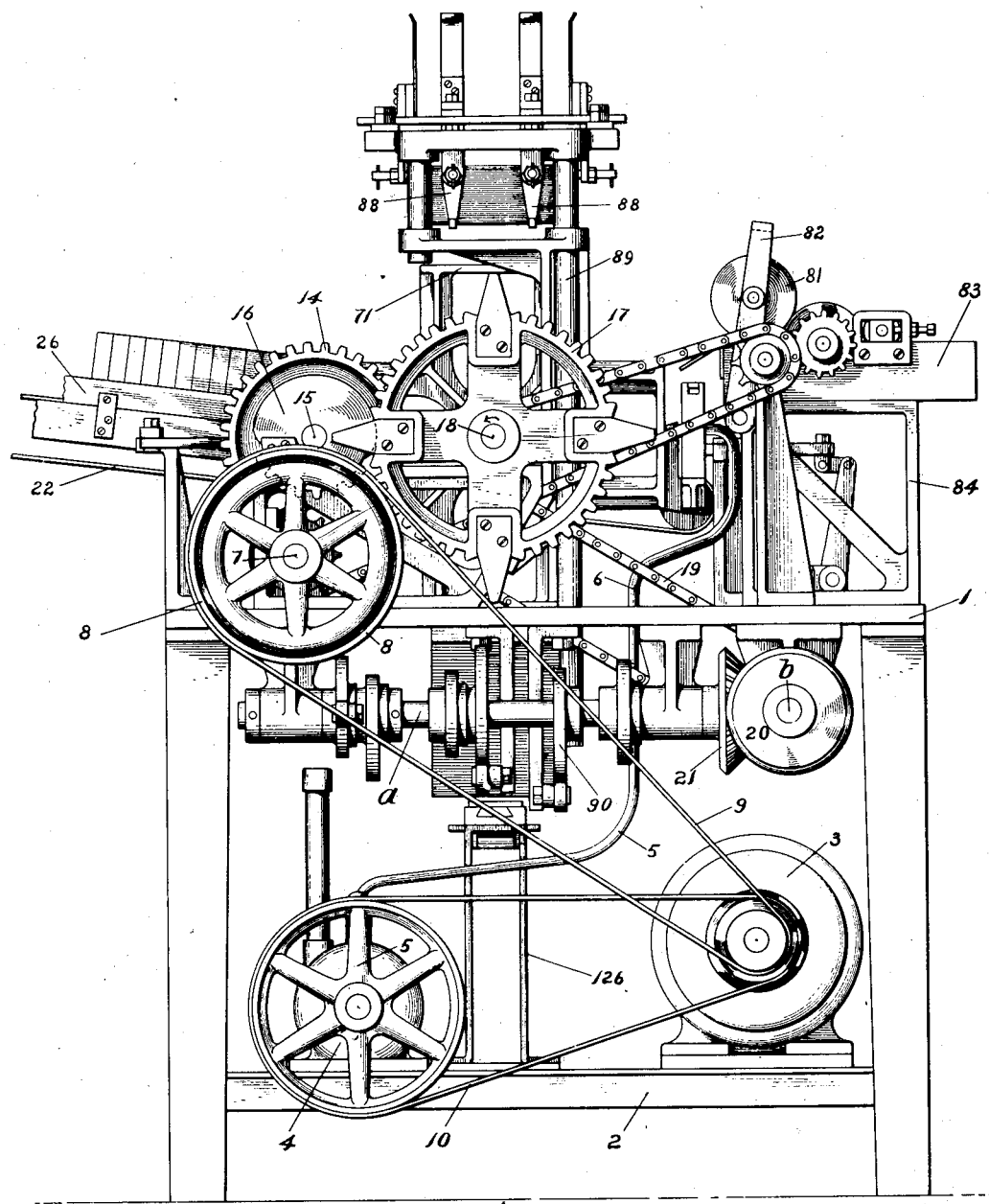
Figure 1 is a rear elevation of a machine embodying the invention.

Briefly stated, the machine provides mechanism and devices whereby, automatically, rectangular boxes made of relatively stiff paper, such as is found in the ordinary commercial cigarette boxes, and composed of a base and cover, are fed to a rotary turret having four box supports, the turret rotating intermittently for angles of ninety degrees, certain labeling operations being performed while the turret or box support is at rest, and also while it is in motion. At one point of rest, at the right of the machine in Fig. 1, the boxes are fed from a belt in front of a plunger, which latter delivers them to a box support on the rotative turret, while the turret is at rest. Rotation of the turret ninety degrees carries the box into an upper position where it comes to rest and a label from a magazine is applied thereto. Further rotation for ninety degrees brings the box opposite a presser, at the left in Fig. 1 whereby the label is smoothed and pressed on the box and also on certain glue pads associated with the turret. Further rotation brings the turret to another position of rest, its lowest position, whereupon the labeled box is discharged from its support and the label stripped from the glue pads. Also, in the present embodiment, when the box is discharged, any extending ends of the label may be folded onto the box both on the sides and on the face opposite to which the label was first applied. As the box is moved from its first position, as applied to the turret, to the upper position where the label is applied, a glue roll coats the outer surface of the box with adhesive, and in the same operation coats with adhesive the glue pads lying alongside the box, so that when the box has arrived at its upper station a label may be applied to the coated surface of the box and also to the coated face of the glued pads. It will therefore be understood that at the upper station not only will the label adhere to the box, but if the label is of such a length as to project onto the glue pads, the projecting portions will be applied to these pads and thereby coated with glue, so that subsequent folding of these portions on the box will effect their adherence thereto.

Figure 3:
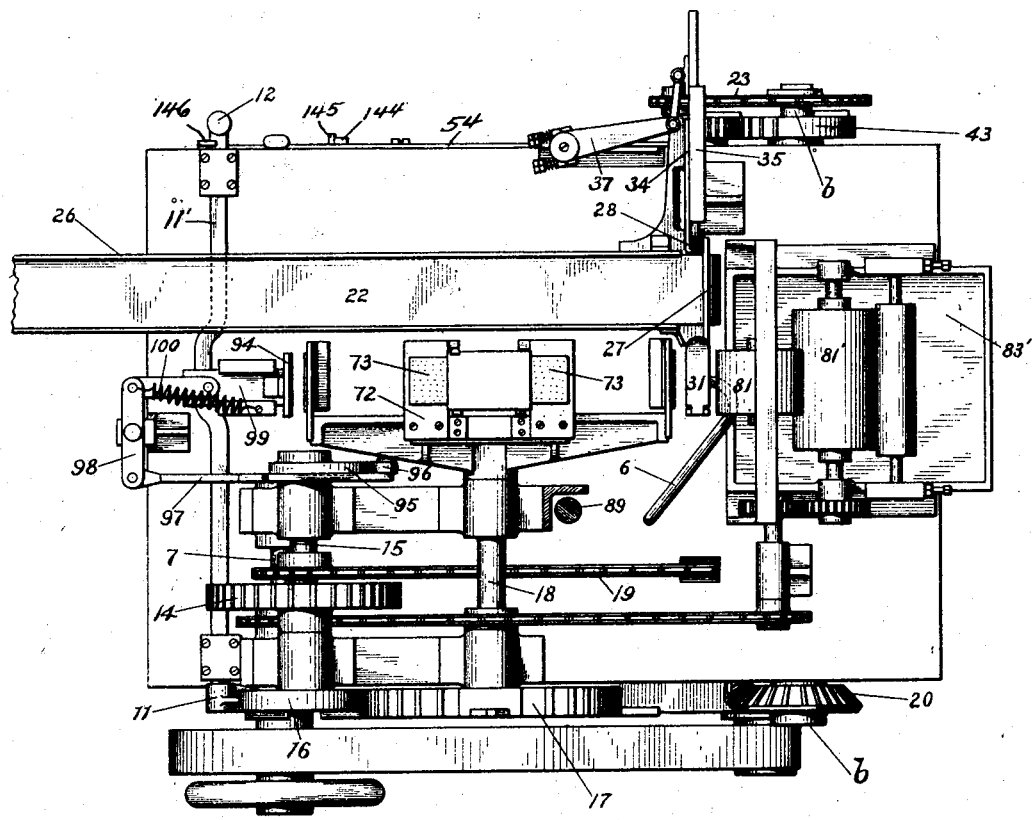
Fig. 3 is a plan view partly in section.

Referring now more particularly to the drawings, the numeral 1 indicates a table having a platform 2 on which is supported an electric motor 3 and a vacuum pump 4, which latter, by means of an air pipe 5 passing through the table communicates with a flexible pipe 6 leading to a pneumatic gripper hereinafter referred to. Cam shafts $a$ and $b$ are supported in suitable hangers beneath the table 1. The numeral 7 indicates a main driving shaft having a belt pulley 8 and belt 9 whereby it is coupled to the motor 3, and the pump 5 is driven from the motor 3 by means of the belt 10. A suitable clutch is employed to couple the pulley 8 with the shaft 7, and a portion of the shift device for this clutch is shown at 11, Fig. 3, including a shift rod 11' having a handle 12 for the operation of the shift device. On the shaft 7 is a main driving pinion 13 meshing with a pinion 14 on a counter shaft 15 suitably supported above the table 1, the shaft 15 having a mutilated gear 16 cooperating with a mutilated gear 17 on a turret shaft 18, whereby the continuous rotation of the main driving pinion effects intermittent rotation of the turret shaft 18 and intermittently translates in an endless path the glue pads and box supports connected to the turret. The cam shaft $b$ is driven from the counter shaft 15 by a chain drive, the chain being shown at 19, and by means of the mitre gears 20 and 21 the cam shaft $a$ is driven from shaft $b$.

Figure 2:
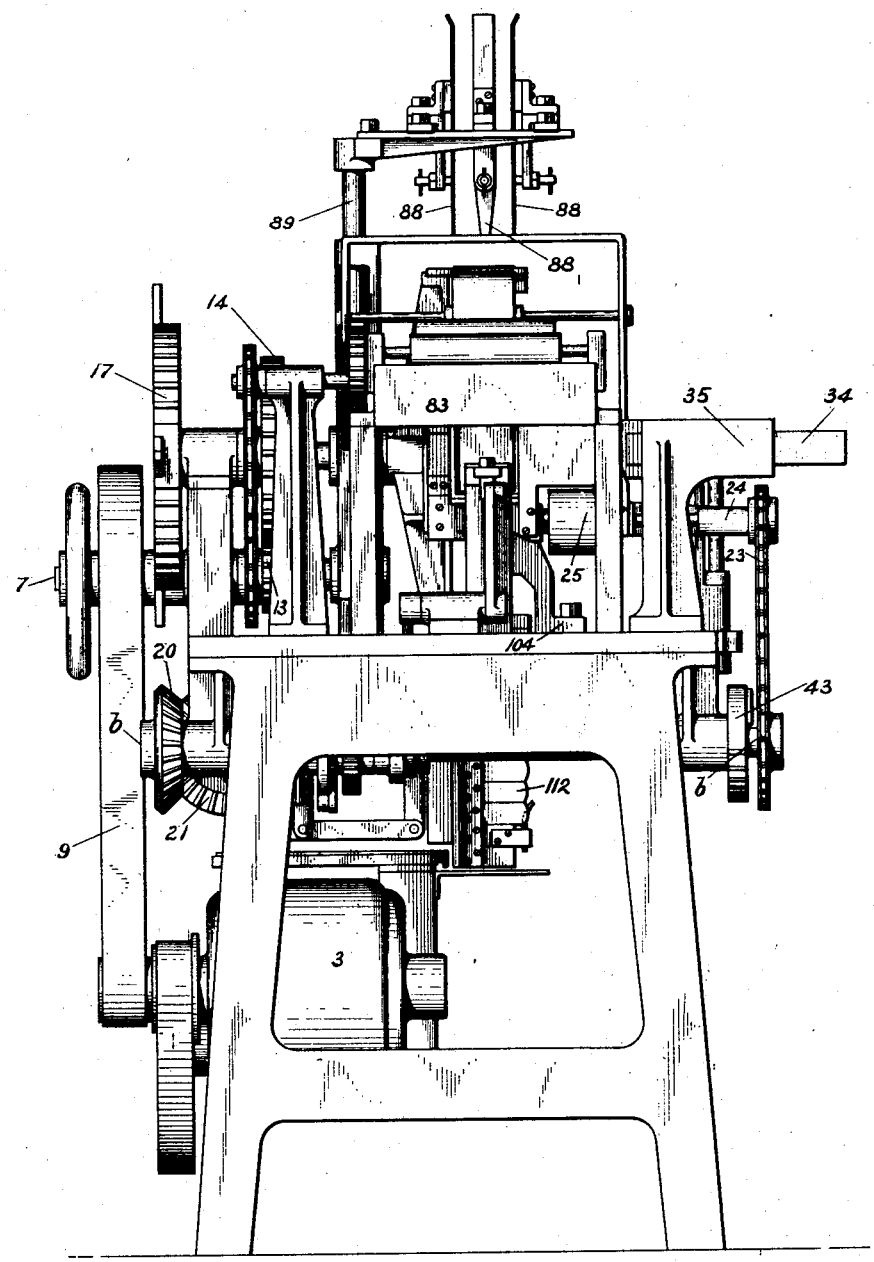
Fig. 2 is a side elevation thereof.

Numeral 22 indicates an endless conveyor belt which is inclined, and on the upper ply of which an attendant may place the boxes to be labeled. The conveyor belt is driven from the shaft $b$ by a chain 23, Fig. 2, driving a shaft 24 to which the inner pulley 25, Fig. 6, of the conveyor belt is connected. The upper ply of the conveyor belt 22 passes between side guides 26, and a stop 27, Fig. 6, arrests the boxes in position in front of a reciprocatory pusher 28 which is adapted to pass transversely of the belt and feed the foremost box from the belt into position opposite a delivery plunger 29, and between the latter and the box carrier, or support, embodied in the turret. Beneath the plunger 29 is a support 30 on which the boxes may rest as they are delivered to the support on the carrier, and above the support 30 is a resiliently operative device comprising a pressing finger 31 pressed downwardly by a spring 32, this device cooperating with the support to yieldingly hold the box in front of the plunger. As a box leaves the belt and approaches the plunger, it is guided into position close to the front face of the plunger, which in this instance has a pneumatic gripper face, by means of an inclined plate 33. The pusher 28 comprises the front end of a plate 34 sliding on a guideway 35 suitably supported from the table 1. To the rear end of the plate 34 is pivotally attached a connecting rod 36 (Fig. 7) also pivotally connected to a rock arm 37 yieldingly connected to an upright rock shaft 38, the lower end of this shaft having an arm 39 linked to one end of a connecting rod 40, the other end of the rod 40 being pivotally and adjustably connected to a crank disc 41, rotating as one with a mutilated pinion 42, the pinion having alternate toothed portions and smooth portions to cooperate with the toothed and smooth portions respectively of a driving gear 43 mounted on the cam shaft $b$. On the gear and pinion 43 and 41 are face members 44 and 45 which cooperate to start the rotation of the pinion gradually from a state of rest. The cam shaft $b$ is continuously driven, and the pair of cooperative gears 41 and 43 cooperate through the operative connections heretofore described to reciprocate the pusher 28 transversely of the belt 22, the pusher moving across the belt in the feeding direction and then dwelling for a length of time, and then returning to initial feeding position and again dwelling for a greater length of time. To effect the relative time of the dwellings referred to, the peripheral length of one smooth portion of the driving gear 43, as at 46, is made greater than the peripheral length of the other smooth portion 47.

The rock arm 37 is coupled to the rock shaft 38 by a split coupling, as indicated in Fig. 9, the shaft 38 being flattened, as at 48, where it engages the arm 37, and the coupling member 49 being yieldingly held against its companion member by pins 50 attached to the rock arm 37 and encircled by springs 51 bearing against nuts 52 on the pins 50. Thus it will be seen that the strain of operation from the mutilated gear is transmitted to the pusher through the split coupling, and that should the movement of the pusher be abnormally resisted, as by a box getting out of normal position, the split coupling will yield and thus, in a great measure, prevent crushing the box or fracturing the machine. The numeral 53 (Fig. 5) indicates a hand lever pivotally connected to a slide 54 on the edge of the table 1, this slide being spring-held in one direction, and operated in the opposite direction by means of the hand lever 53. Operation of this hand lever in the proper direction shifts the clutch 11 and shuts down the machine. The upper end or handle 53' of the lever 53 is close to the split coupling above mentioned, so that when the split coupling expands the coupling member 49 may strike the handle 53' and shift the slide 54, to shut down the machine by shifting the rod 11'.

One of the box carriers or box supports comprised in the turret hereinbefore referred to will assume a position of rest in front of the delivery plunger 29, and it is the main province of the plunger 29 to deliver a box into the box support on the turret. In the present embodiment the plunger 29 forms the front end of a supporting rod 55 guided in a bracket 56 on the table 1, and moved in one direction by a cam 57 cooperating with a roller 58 on a rod 59, which latter is in turn coupled to an arm 60 of a rock shaft 61 having another arm 62 connected to the rod 55 by a link 63. The cam operates to positively move the plunger in a direction away from the box support on the turret, a spring 64 being employed to effect the delivery movement of the plunger. The plunger 29 has a recessed or dished face, as indicated in Figs. 4 and 6, and the flexible air passageway or pipe 6 hereinbefore referred to communicates with said recess, and moves back and forth with the plunger. As the boxes are delivered from the belt in close relation to the recessed face of the plunger 29, the cam 65, Fig. 12, on the cam shaft $a$, by means of the cam roller 66, connecting rod 67, and crank 68, opens the passageway 5 so that the pressure of the air in the passageway is reduced below atmospheric, and the box opposite the recess in the plunger will be pneumatically gripped to the plunger, and the valve in the passageway 5, controlled by the cam 65, will be held open until the box is delivered to its support in the turret, whereupon the valve will be closed and the gripper de-energized, there being ordinarily sufficient leakage to prevent a pneumatic grip after the valve is closed. Or when the pneumatic passageway is closed by the valve, that portion between the pneumatic gripper of the plunger and the valve may be thrown open to the atmosphere by proper construction of the valve.

In the present embodiment a plurality of supports for the boxes or articles to be labeled are employed, and are mounted in an intermittently rotating turret fixed to the shaft 18. This turret comprises four pairs of arms 70, each pair being connected by a cross piece 71, on which latter are mounted the devices for directly supporting and positioning the boxes and also the glue pads. To the cross piece 71 are fastened plates 72 extending parallel to the shaft 18 and carrying glue pads 73, which latter may consist of rubber, covered with canvas, glued or otherwise fixed to the plate 72. The glue pads are spaced apart in pairs peripherally of the turret for the reception therebetween of one of the boxes to be labeled. The boxes are fed to the turret in a predetermined direction transversely of the gluing plane of the pad 73, as will be understood from the foregoing, and are delivered between the pads 73 onto lugs 74 two of which are adjustably fixed to the turret in a plane beneath the pads at such position that when the box is resting upon these supporting lugs, its outer face will be substantially flush with the gluing plane of the pads 73. The position of the box longitudinally of the shaft 18 may be determined by rigid gauges 75, having inclined faces 76, and spring gauges or holders 77. As the box is delivered to the turret by the pneumatically gripping plunger 29 it passes between the gauges 75 and 77, and should it be slightly out of alignment with its intended position on the turret, the inclined faces 76 or the similar faces 78 on the spring gauges 77 will assist in positioning it. The members 77 also cooperate to grip the box to the turret and retain it therein until it is forced therefrom by a discharge mechanism hereinafter referred to. Thus it will be seen that in the present embodiment the article support, or holder, is stationary relative to the glue pad, although movable therewith intermittently in an endless path. The plates 72 may be adjusted toward and from each other by means of the bolts 79 entering the plate 71 and passing through slots in the plates 72, and the gauges 75 may form parts of plates 80 also adjustably secured to the plate 71.

The box having been delivered to the turret, as hereinbefore described, an outer face thereof will be in the planes of the gluing faces of the pads 73, or substantially so, and as the pads with the article associated therewith are translated to label-applying position by the rotation of the turret; a glue roller passes over the glue pads and the said face of the box and applies glue or other adhesive to all three; but a single operation being required to effect the gluing. Inasmuch as a label is to be applied to the glued faces of the pads and the box for the purpose of causing the label to adhere to the box, it will be seen that whereas the end portions of the label will have glue applied thereto on account of their contact with the glue pads, the central portion of the label will have glue applied thereto by the glued face of the box itself. Thus, in the general labeling operation, the box becomes, as it were, and temporarily, a part of the glue pad, being coated in one operation with the pads. The numeral 81, Fig. 4, indicates a glue roll which moves from a glue carrying roller 81', from which it receives glue, toward and from the path of the glue pads, and the pads and the box wipe on the glue roll 81 to receive glue therefrom. Preferably the glue roll 81 is controlled in its movement toward and from the path of the pads so as to uniformly press against the surfaces of the pads and the box. This is accomplished in the present embodiment by mounting the glue roll 81 on a yoke 82 pivoted at 83 and having an arm 84 to which is coupled a cam-operated connecting rod 85 having a cam roller 86 cooperating with a cam 87, a spring 88' being arranged to move the roll 81 away from the path of the pads, the cam 87 being of such contour as to force the glue roll towards the pads and into contact therewith uniformly. The construction of the cam is such as to cause the roll 81 to press uniformly on the pads and the exposed face of the box notwithstanding the fact that the surface to be coated is plane but moves in a circular path. The glue carrying roller 81 receives glue from a tank 83' supported on a frame 84' upstanding from the table 1.

The means to apply a label to the coated faces of the pad and the box comprises a label magazine having a series of depending fingers 88 between which a pack of labels is inserted and held. The magazine reciprocates vertically, being supported on a rod 89, the lower end of which passes through the table 1 and is operated by a cam 90 through the instrumentality of a cam roll 91 on a rock lever 92 connected by a link 93 to the rod 89, Fig. 14. The magazine having descended, the lowermost label of the pack is applied over the coated surfaces of the pads and the box, and adheres thereto so that upon the rise of the magazine the adhering label will be stripped from the bottom of the pack. Thereupon the turret makes another rotary movement of ninety degrees carrying the pads, box and adhering label to in front of a label pressing plate 94, Figs. 3 and 10, where the label is firmly pressed against the box and the pads to more firmly secure the label to the box and to cause a more efficient contact between the label and the pads so that the end portions of the label will be efficiently coated with glue. In the present embodiment the label presser 94 is operated by a cam 95 on the counter shaft 15 cooperating with a cam roll 96 on a pivotally jointed rod 97 connected to one end of a rock lever 98, the other end of the lever being linked to the slide 99 supporting the presser 94. A spring 100 is employed to move the presser 94 toward the glue pads, the cam being employed to effect retreat of the same.

The pressing operation having been effected, another rotary movement of the turret will bring the pad and label to another position of rest, in the present instance to its lowermost position, where the parts come to rest opposite an opening 101 in the table 1, as illustrated in Figs. 10, 15 and 19. At this station is disposed a discharging plunger 102 mounted on a vertically operating slide 103 supported in a guide bracket 104 and joined by a connecting rod 105 to a rock lever 106, one arm of the latter being connected to a rod 107 having a roll 108 cooperating with a cam 109 on the cam shaft $a$. Operation of the cam effects the discharging operation of the plunger 102, positively, spring 110 being mounted to effect the rise of said plunger. The plunger 102 discharges the box and the label adhering thereto in a direction transversely of the plane of the pads, removing the article from its support, and removing the adhering label from the pads 73, and it will be observed that the direction of discharge from the support or holder is in a direction relative to said holder opposite to that in which the box was fed thereto. Thus, in the present embodiment, the label is stripped or removed from the glue pads in a direction opposite to that in which it was fed thereto so that the label does not pass through the support between the pads. Hence, although the folding of the label is accomplished, as will be described, the initial fold is not so acute as it might otherwise be.

In the present embodiment the discharged box and label are received in a passageway or channel comprising a plate 111 on which are supported a series of brushes 112 spaced apart to form a vertical passageway having brush walls, into which passageway the box and label are pushed by the plunger 102. On entering the passageway the extended ends of the label are folded upwardly against a face of the box different from the first coated face, in the present instance against the sides of the box adjacent the first coated face, as illustrated in Fig. 15.

Also, in the present embodiment, the upwardly extending glued ends c, c, of the label (Fig. 15) are folded on the face of the box opposite the first coated face. This last operation is accomplished by a pair of reciprocatory folding fingers 112′ comprised in rollers mounted on slides 113 guided in ways 114 on the lower face of the table 1 and movable transversely of the path of discharge from the turret. The numeral 115 indicates a rotary shaft, the opposite ends of which have crank discs 116 coupled by connecting rods 117 to rock levers 118 linked to the slides 113. At 119 is shown a chain cooperating with a sprocket wheel on the shaft 115 and another sprocket wheel on a shaft 120, the latter shaft having a mutilated driven pinion 121 cooperating with a mutilated driving gear 122 on one of the cam shafts. Rotation of the gear 122, through the connections just described, will effect reciprocation of the fingers 112′, and effect the folding of the label on the face of the box, the timing being such that one of the fingers 112′ operates before the other so as to provide for the overlapping of the ends of the label should they be of such length as to be overlapped.

The boxes descend through the channel provided by the brushes 112, succeeding boxes pushing the foremost boxes downwardly through this channel, the brushes smoothing and pressing the label against the adjacent sides of the box. Eventually the labeled boxes emerge from the channel onto a track or other support 123, whence they may be removed by hand, or they may be automatically fed along the track 123 and eventually discharged from beneath the table 1 by means of a reciprocatory pusher 124 sliding in a guideway 125 supported on a bracket 126, the pusher 124 being operated by a rock lever 127, Fig. 18, cooperatively connected to a cam 128 on the cam shaft $a$ by a cam link 129 and cam roll 130, ejecting movement of the pusher being positively effected by the cam, and its retreat being effected by a spring 131. Should there be any abnormal resistance to the ejecting movement of the pusher 124, as by one of the boxes being held against normal movement, a device is provided to cause the main driving clutch of the machine to be shifted so as to uncouple the driving mechanism, that is, the belt pulley, etc. from the driven mechanism of the machine. In the present embodiment this device, or safety member, comprises a connecting rod composed of two plates 132 and 133, Fig. 18, capable of movement relatively to each other, one of the plates, as 133, being slotted, as indicated at 134, and the other plate having a pin 135 passing through the slot. Connected to the pusher 124 is a pivot pin 136 bearing partly on the plate 132 and partly on the other plate 133. A pin 137 is connected to the plate 132 and a spring 138 is fastened to the slotted plate 133 and so engages the pins 135 and 137 as to press the plates 132 and 133 against the pivot pin 136. The numeral 139 indicates a trip on an arm 140 adjacent the path of movement of the plate 132 and pivoted at 141 to a bracket 142, the arm 140 being also pivoted to a link 143 operatively connected with a shift arm 144 cooperating with a pin 145 of the reciprocatory shift member 54. Under normal operation, the reciprocation of the pusher 124 proceeds without change, but should abnormal resistance be encountered the plate 132 will be lifted from the plate 133 against the resistance of the spring 138 and a projecting portion, as the lug 147, will contact with the trip 139 and effect the stoppage of the machine, by removing from the slot in rod 11′ the latch or tooth 146 carried by the shift member 54. The spring 146′ will then move rod 11′ to throw out the clutch.

In the present embodiment the channel 111 preferably rises and falls, being lifted to carry the uppermost brushes 112 close to the box in the turret, so that there is very little if any drop of the box when it enters between the brushes. The rise and fall of the channel is effected through the instrumentality of a cam 150 cooperating with a roll 151 on a rock lever 152, fulcrumed on a bracket 153, and pivotally joined to one end of a link 154 in turn pivotally connected to the channel 111, the channel sliding on a guide 155 depending from the underside of the table 1. The channel 111 may be provided with a deflector 156 to urge the boxes into alignment as they are pushed downwardly by the plunger 102.

In view of the foregoing, it is unnecessary to describe the operation of the machine in full detail. It may be called to attention, however, that in the embodiment of the invention illustrated the boxes are supported on the turret or carrier so that one of the surfaces to be labeled is exposed for preliminary reception of glue, this surface being positioned in a plane tangent to the circle of revolution of the surface around the axis of the carrier. The boxes are received in the openings in the carrier or turret, which openings are provided between each pair of label gluing pads 73, the boxes resting in such opening on the rests or lugs 74 which, as will be seen extend in a generally circumferential direction and are adjustable in a general radial direction, so that they are capable of being set in different radially spaced relations to the gluing surfaces of the pads 73. Thus by adjusting the lugs 74 either a shallow box or a deep box may have its face presented substantially flush with the gluing surface of the pads. Adjustment of the rigid gauge members 75 transversely of the axis of the carrier adapts the latter for the reception of the boxes of different widths which may require similar adjustment of the pads 73. The gluing surfaces of the pads 73, in the embodiment illustrated, are tangent to the circle of revolution thereof around the axis 18, the planes of these surfaces being also parallel to said axis. The disposition of the pads in the relation just noted makes for efficiency of operation and enables a machine to be constructed in which the carriers move in a vertical plane and thereby present the active surfaces of the pads and the adjacent surfaces of the boxes in an outward relation convenient for inspection and care. Also several of the operative instrumentalities may be arranged some on one side and some on the other side of the path of the carriers, notwithstanding which, manipulation of such instrumentalities in cleaning or repairing is not obstructed by the carrier. The pads 73 are at the sides of the openings in which the boxes lie and, as illustrated, are in generally circumferential relation to such position.

Thus by the above described construction are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent is:

1. In an apparatus of the character described, in combination, a box carrier, an endless belt adapted to support boxes, a plunger adapted to deliver a box to said carrier, and means adapted to feed a box from said belt into position between said carrier and plunger comprising a reciprocatory pusher, a driving gear having alternate toothed and smooth portions, a pinion having alternate toothed and smooth portions adapted to co-operate with the toothed and smooth portions, respectively, of said driving gear, and operative connections whereby the rotation of said pinion effects reciprocation of said pusher, the peripheral length of one smooth portion of said driving gear being greater than the other.

2. In an apparatus of the character described, in combination, a box carrier, an endless belt adapted to support boxes, a plunger adapted to deliver a box to said carrier, and means adapted to feed a box from said belt into position between said carrier and plunger comprising a reciprocatory pusher, a driving gear having alternate toothed and smooth portions, a pinion having alternate toothed and smooth portions adapted to cooperate with the toothed and smooth portions, respectively, of said driving gear, and operative connections whereby the rotation of said pinion effects reciprocation of said pusher, the peripheral length of one smooth portion of said driving gear being greater than the other, said gear and pinion including face members adapted to co-operate to start the rotation of said pinion gradually from a state of rest.

3. In an apparatus of the character described, in combination, a box carrier, a reciprocatory plunger adapted to deliver a box to said carrier, means adapted to feed a box into position between said carrier and said plunger, a support on which the box rests between said carrier and plunger, said plunger having a pneumatic gripper adapted to grip the box as it is moved to said carrier, and means adapted to energize and de-energize said gripper at predetermined times.

4. In an apparatus of the character described, in combination, a box carrier, a reciprocatory plunger adapted to deliver a box to said carrier, means adapted to feed a box into position between said carrier and said plunger, a support on which the box rests between said carrier and plunger, said plunger comprising a recessed face opposite said box, a flexible air passageway communicating with said recess, and means adapted to reduce the pressure of air in said passageway below atmospheric pressure at predetermined times.

5. In an apparatus of the character described, in combination, a box carrier, a reciprocatory plunger adapted to deliver a box to said carrier, means adapted to feed a box into position between said carrier and said plunger, a support on which the box rests between said carrier and plunger, said plunger having a pneumatic gripper adapted to grip the box as it is moved to said carrier, means adapted to energize and de-energize said gripper at predetermined times, and a resiliently operative device adapted to co-operate with said support to hold the box in front of said plunger.

6. In an apparatus of the character described, in combination, a box carrier, a reciprocatory plunger adapted to deliver a box to said carrier, means adapted to feed a box into position between said carrier and said plunger, a support on which the box rests between said carrier and plunger, said plunger having a pneumatic gripper adapted to grip a box as it is moved to said carrier, means adapted to energize and de-energize said gripper at predetermined times, and means adapted to guide a box into position close to the gripper of said plunger as it moves to position between said plunger and carrier.

7. In an apparatus of the character described, in combination, a box carrier, a reciprocatory plunger adapted to deliver a box to said carrier, means adapted to feed a box into position between said carrier and said plunger, a support on which the box rests between said carrier and plunger, said plunger having a pneumatic gripper adapted to grip the box as it is moved to said carrier, means adapted to energize and de-energize said gripper at predetermined times, a resiliently operative device adapted to co-operate with said support to hold the box in front of said plunger, and means adapted to guide a box into position close to the gripper of said plunger as it moves to position between said plunger and carrier.

8. In an apparatus of the character described, in combination, a box carrier, an endless belt adapted to support boxes, a reciprocatory plunger adapted to deliver a box to said carrier having a pneumatic gripper adapted to grip the box as it is moved to said carrier, means adapted to energize and de-energize said gripper at predetermined times, a reciprocatory pusher adapted to feed boxes from said belt to position between said plunger and carrier, means adapted to yieldingly hold a box in front of said plunger, a pair of co-operative mutilated gears, means adapted to continuously drive one of said gears, and means connecting the other gear to said pusher for operation of the latter.

9. In an apparatus of the character described, in combination, an article holder comprising a glue pad, means adapted to feed an article to said holder in a predetermined direction transversely of the gluing plane of said pad, means adapted to coat with glue said pad and said article, means adapted to apply a label to the glued face of the pad and article, and means adapted to remove said label from said pad and the said article from said holder in a direction relative thereto opposite to that in which it was fed thereto.

10. In an apparatus of the character described, in combination, an intermittently rotatable tangentially disposed glue pad, an article support rotatable therewith, adapted to dispose a face of a removable article in position to be glued, means automatically co-operative with said support adapted to place an article on said support at a position of rest of said pad, means adapted, in one operation, to coat said pad and said article with glue, and means adapted to apply a label to said pad and said supported article at another position of rest of said pad.

11. In an apparatus of the character described, in combination, a glue pad, means adapted to intermittently translate said pad in an endless path, an article holder adjacent said pad and movable therewith, means adapted to feed an article to said holder in a predetermined direction transversely of the gluing plane of said pad, means adapted to apply glue to said pad and the article supported adjacent thereto, means adapted to apply a label to the glued faces of said pad and article, and means adapted to discharge the article from said holder in a direction relative thereto opposite to that in which it was fed thereto.

12. In an apparatus of the character described, in combination, means adapted to coat with adhesive both a glue pad and an article to be labeled, and means adapted to co-operate with said means to apply a label to the coated faces of said pad and said article, said first-mentioned means comprising a glue pad and an associated article support intermittently movable in an endless path, a reciprocatory plunger adapted to deliver an article to said support, and means adapted to cause said plunger to pneumatically grip and release the article at predetermined times.

13. In an apparatus of the character described, in combination, a pair of glue pads, a support adapted to dispose a box between said pads with one face substantially flush with the gluing plane of said pads, means adapted to coat said pads and box face with adhesive, means adapted to apply a label to said coated pad and box, means adapted to discharge said so labeled box from said support and to effect the folding of portions of the coated label on the sides of the box adjacent said coated face, and means adapted to fold the coated ends of the label on the face of the box opposite said first-coated face, the one end before the other, comprising a pair of reciprocatory folding fingers movable transversely of the path of discharge, a rotatable shaft, connections whereby the rotation of said shaft effects reciprocation of said fingers, and means adapted to rotate said shaft comprising a continuously rotatable mutilated driving and a mutilated driven pinion co-operative therewith.

14. In an apparatus of the character described, in combination, a driving mechanism, a driven mechanism, a device adapted to cause the driven mechanism to be coupled and uncoupled with said driving mechanism comprising a trip, a reciprocatory box pusher, and means whereby said pusher is operated from said driven mechanism comprising two members adapted to move relatively to each other under abnormal resistance to the movement of said pusher, one of said members being adapted to contact said trip when so moved relative to the other.

15. In an apparatus of the character described, in combination, a driving mechanism, a driven mechanism, a device adapted to cause the driven mechanism to be coupled and uncoupled with said driving mechanism comprising a trip, a reciprocatory box pusher, and means whereby said pusher is operated from said driven mechanism comprising a connecting rod composed of two relatively movable plates movable adjacent said trip, one of which plates is slotted and the other of which has a pin passing through said slot, a pivot pin connected to said pusher and bearing partly on one plate and partly on the other, a second pin passing through said slotted plate, and a spring fastened to said slotted plate and so engaging said pins as to press said plates against said pivot pin, one of said plates having a portion adapted to contact said trip on relative movement between said plates under abnormal resistance to operation of said pusher.

16. In an apparatus of the character described, in combination, a rotatable box carrier adapted to support a box and expose a surface thereof in a plane tangent to the circle of revolution of such surface, and a label gluing pad rotatable with the box, the gluing surface of said pad being tangent to the circle of revolution thereof and at the side of the position of the box.

17. In an apparatus of the character described, in combination, a rotatable box carrier adapted to support a box and expose a surface thereof in a plane tangent to the circle of revolution of such surface, and a label gluing pad rotatable with the box, the gluing surface of said pad being tangent to the circle of revolution thereof and at the side of the position of the box in a circumferential direction.

18. In an apparatus of the character described, in combination, a rotatable box carrier adapted to support a box and expose a surface thereof in a plane tangent to the circle of revolution of such surface, a label gluing pad rotatable with the box, the gluing surface of said pad being tangent to the circle of revolution thereof and at the side of the position of the box, and a label magazine reciprocal radially of the axis of revolution adapted simultaneously to apply a label to said surfaces of the box and the pad.

19. In an apparatus of the character described, in combination, a rotatable box carrier adapted to support a box and expose a surface thereof in a plane tangent to the circle of revolution of such surface, a label gluing pad rotatable with the box, the gluing surface of said pad being tangent to the circle of revolution thereof and at the side of the position of the box, means adapted to deliver the box radially to supporting position on said carrier, and means adapted to discharge the box in a direction opposite to that of delivery.

20. In an apparatus of the character described, in combination, a rotatable box carrier adapted to support a box and expose a surface thereof in a plane tangent to the circle of revolution of such surface, a label gluing pad rotatable with the box, the gluing surface of said pad being tangent to the circle of revolution thereof and at the side of the position of the box, means operative at one side of the path of said carrier adapted to deliver the box to said carrier, and means operative at the opposite side of said path adapted to discharge the box.

21. In an apparatus of the character described, in combination, a rotatable box carrier adapted to support a box and expose a surface thereof in a plane tangent to the circle of revolution of such surface, a label gluing pad rotatable with the box, the gluing surface of said pad being tangent to the circle of revolution thereof and at the side of the position of the box, means operative at one side of the path of said carrier adapted to deliver the box to said carrier, means operative at the opposite side of said path adapted to discharge the box, said first mentioned means including a reciprocal box moving plunger having a pneumatic gripper face, and means to energize and deenergize said face.

22. In an apparatus of the character described, in combination, a rotatable box carrier having a radially extending opening to receive the box, a glue pad supported at the side of said opening for rotation with the carrier, means operative at one side of the path of said carrier for delivering the box into said opening and a reciprocal discharging plunger operative at the opposite side of said path movable into and out of said opening.

23. In an apparatus of the character described, in combination, a rotatable turret including glue pads in tangential planes at different points around the axis of rotation, and box rests between said pads radially spaced from the gluing surfaces of said pads.

24. In an apparatus of the character described, in combination, a rotatable box carrier including a plurality of generally circumferentially extending box supporting lugs adjustable generally radially of the axis of rotation, and a glue pad the gluing surface of which lies in a plane generally parallel to said axis and spaced radially from said supporting lugs.

25. In an apparatus of the character described, in combination, a rotatable box carrier including a plurality of generally circumferentially extending box supporting lugs adjustable generally radially of the axis of rotation, and a glue pad the gluing surface of which lies in a plane generally parallel to said axis and spaced radially from said supporting lugs, said glue pad being adjustable transversely of said axis.

26. In an apparatus of the character described, in combination, a rotatable box carrier including a plurality of generally circumferentially extending box supporting lugs adjustable generally radially of the axis of rotation, and a glue pad the gluing surface of which lies in a plane generally parallel to said axis and spaced radially from said supporting lugs, said glue pad being adjustable transversely of said axis, and means adapted to gauge the position of the box axially of the carrier including a transversely adjustable rigid gauge member having an inclined face, and a spring gauge member adapted to cooperate with the box and hold it against said adjustable gauge member.

27. In an apparatus of the character described, in combination, a rotatable box carrier adapted to support a box and expose a surface thereof in a plane tangent to the circle of revolution of such surface, a label gluing pad rotatable with the box, the gluing surface of said pad being tangent to the circle of revolution thereof and at the side of the position of the box in a circumferential direction, a label magazine, reciprocal radially of the axis of revolution of the carrier, adapted simultaneously to apply a label to said surfaces of the box and the pad, said carrier having rests for the box radially spaced from the gluing surface of said pad.

28. In an apparatus of the character described, in combination, a rotatable box carrier adapted to support a box and expose a surface thereof in a plane tangent to the circle of revolution of such surface, a label gluing pad rotatable with the box, the gluing surface of said pad being tangent to the circle of revolution thereof and at the side of the position of the box in a circumferential direction, a label magazine reciprocal radially of the axis of revolution of the carrier, adapted simultaneously to apply a label to said surfaces of the box and the pad, said carrier having rests for the box radially spaced from the gluing surface of said pad, means operative at one side of the path of said carrier adapted to deliver the box to said carrier, and means operative at the opposite side of said path adapted to discharge the box and a label therewith.

In testimony whereof I affix my signature, in the presence of two witnesses.

HAROLD CARLE.

Witnesses:
LYNDON C. PALMER,
HAROLD C. COPPINS.